April 21, 1959 A. G. FOX 2,883,627
TRANSMISSION LINE NETWORK
Filed Aug. 6, 1956

INVENTOR
A. G. FOX
BY Roy M. Porter Jr.
ATTORNEY 2,883,627
Patented Apr. 21, 1959

2,883,627

TRANSMISSION LINE NETWORK

Arthur G. Fox, Rumson, N.J., assignor to Bell Telephone Laboratories, Incorporated, New York, N.Y., a corporation of New York Application August 6, 1956, Serial No. 602,101

4 Claims. (Cl. 333—5)

Figure 1:
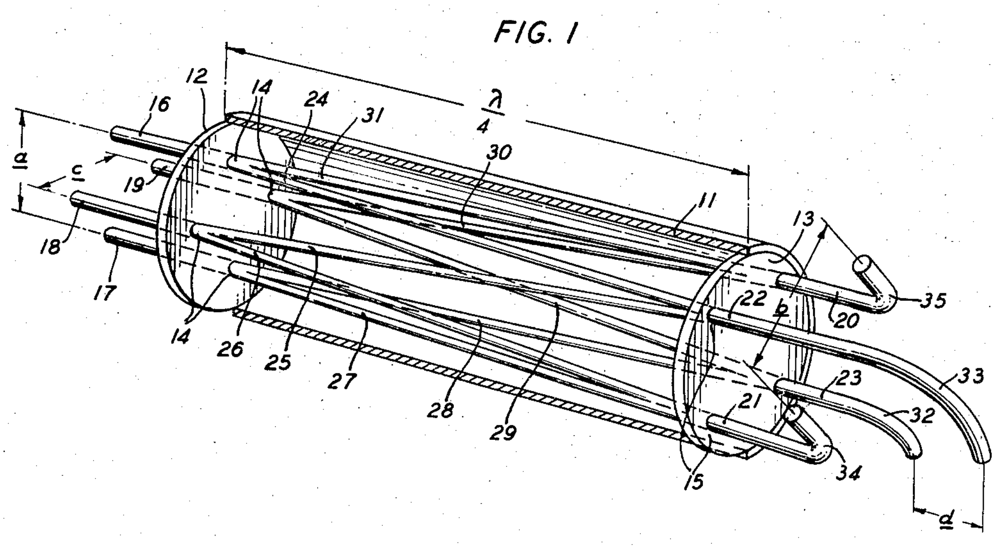

This invention relates to very high frequency electromagnetic wave transmission systems and, more particularly, to balanced bridge circuits, or four-branch biconjugate networks for dividing electromagnetic wave energy between balanced transmission line pairs.

One of the more useful circuit arrangements of ordinary low frequency communication practice is the so called bridge circuit or balanced network. One particular form, sometimes referred to as the hybrid coil, makes possible two-way operation of a telephone line. In the microwave frequency range in waveguide components, the closest equivalents of the hybrid coil are the hybrid junction, or magic-tee and the 3-decibel directional coupler. Both of these are four-branch waveguide power dividing networks in which a balance, or a nonconnection is maintained between some two of the branches regardless of the branch to which initial power is applied. In the hybrid junction if power is applied to one of two conjugately related branches, it will divide equally between the two other or "adjacent" branches with none appearing in the remaining or "opposite" branch. In addition to the balance, there is a phase relationship such that when power is applied to the one branch, it will appear in phase in the adjacent branches, but if it is applied to the opposite branch, it will appear out of phase in the adjacent branches. A similar power division and phase relationship exists in the directional couplers. Similar networks are also available for frequencies below the microwave range and above the low frequency range of the hybrid coil, but these networks are often complicated.

It is, therefore, an object of the present invention to divide power supplied by balanced transmission lines with the phase and amplitude relationship typical of the hybrid network.

It is a further object to simplify and improve biconjugate networks operating in frequency ranges below the microwave range.

In accordance with the invention, four similar quarter wave shorted sections or transmission lines, physically arranged in a compact form, are electrically connected in a bridge. As will be explained more clearly hereinafter in connection with the drawing, connections across the diagonals of the bridge between the junctions formed between adjacent sections comprise two branches that are conjugate to each other. Connections across opposite center points of opposite sections comprise two other branches that are conjugate to each other and in coupling relationship with the first two branches.

These and other objects, the nature of the present invention, and its various advantages and features will appear more fully upon consideration of the various specific illustrative embodiments shown in the accompanying drawings and described in the following detailed description of these drawings.

Figure 2:
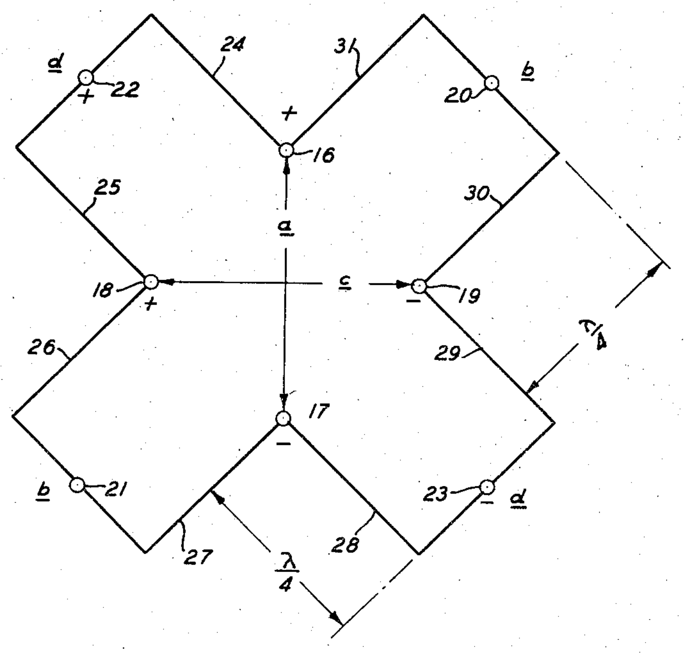

In the drawings:

Fig. 1 is a perspective view of a biconjugate network in accordance with the invention; and Fig. 2 is a schematic representation of the network of Fig. 1.

Referring more particularly to Fig. 1, an illustrative embodiment of the invention is shown which comprises four quarter wave yokes arranged in the required physical position relative to each other and to the output connections, and a suitable supporting structure arranged to hold them in this position. As illustrated, the supporting structure comprises a rigid cylindrical shield 11 which may be made of conductive, nonconductive, or electrically dissipative material. In addition to its supporting function shield 11 serves as a protection from outside mechanical and electrical influences but otherwise plays no substantial part in the electrical operation of the invention. Therefore, its physical form is subject to considerable variation. Extending transversely across shield 11 and suitably fastened thereto at points spaced apart longitudinally substantially an odd multiple of one-quarter wavelengths of the mean operating frequency are two thin dielectrical spacers 12 and 13. Four apertures 14 extend through the thickness of spacer 12 at equally spaced points representing the corners of a square. Four similar apertures 15 are located in spacer 13 and are displaced 45 degrees about the longitudinal axis of shield 11 from the corresponding apertures 14 in spacer 12.

Spacer 12 supports four similar elongated conductors or wires 16 through 19 that extend parallel to each other into apertures 14 from the left. The radius of each conductor should be small compared to the distance between the nearest conductor centers. Diagonally opposed conductors 16 and 17 comprise one pair or one input branch designated *a* and are adapted to be connected to any balanced electromagnetic wave device such as a source, load, or coupling transducer depending upon the particular application. A second input circuit designated *c* comprises the pair of conductors 18 and 19. Since the electric and magnetic field vectors supported by one pair are respectively at right angles with the field vectors supported by the other pair, the pairs are uncoupled or orthogonally related. Four similar conducting elements 20 through 23 emerge to the right of spacer 13 from apertures 15 and form the two orthogonally related conductor pairs or output branches labelled *b* and *d*. These branches are in turn connected to suitable electromagnetic wave devices.

Extending between spacers 12 and 13 and supported by the apertures therein are eight conductive elements 24 through 31 forming four quarter wave shorted transmission line sections and connecting the right hand ends of the first group of conductors 16 through 19 to the left hand ends of the second group of conductors 20 through 23. More particularly, each conductor of the first group 16 through 19 is joined with or forks into two conductors of the group 24 through 31. Each of these two conductors is in turn connected to one of the circumferentially adjacent conductors of the second group 20 through 23. For example, conductor 18 of pair 18—19 is connected by conductor 26 to conductor 21 of pair 20—21 and by conductor 25 to conductor 22 of pair 22—23. Similarly, conductor 19 of pair 18—19 is connected by conductor 30 to conductor 20 of pair 20—21 and by conductor 29 to conductor 23 of pair 22—23. In like manner the conductors 16 and 17 of pair 16—17 are connected by conductors 24 and 31, and by conductors 27 and 28 to the conductors of the output pairs, respectively.

The diameters of conductors 24 through 31 are preferably smaller than the diameters of conductors 16 through 17 and 20 through 23 with the diameters relatively proportioned according to principles familiar to the art so that an impedance match is obtained between a single conductor, such as 18, at the point where it forms a junction with double conductors such as 25 and 26.

Electrically, conductors 24 through 31 appear as schematically represented in Fig. 2. Thus, they constitute four shorted transmission line sections 24—25, 26—27, 28—29 and 30—31. The shorted end of each is spaced an odd multiple of one-quarter wavelength in electrical length away from the open end thereof. Since the shorted end of each comprises, the acute angle junction between two conductors and the "shorting bar" is of zero length, the electrical length of the section is the physical length as measured along the bisector of this acute angle. The open ends of the sections are connected in series to form a four sided bridge. Pairs 16—17 and 18—17 are connected across respective diagonals of the bridge while pairs 20—21 and 22—23 are connected across respectively opposite shorted ends of the sections. Thus, if equal voltages are applied across the two diagonals from pair 16—17 with conductor 16 positive and from pair 18—19 with conductor 18 positive, as represented on Fig. 2 by the symbols associated with the conductors, a voltage appears across pair 22—23 with conductor 22 positive and conductor 23 negative, representing the resultant of the two original voltages. No voltage appears between conductors 21 and 20 which are at the same potential. The nature of the quarter wave shorted section 30—31 is such that it presents a high impedance between conductors 16 and 19 and section 26—27 presents a high impedance between conductors 17 and 18. If either one of the voltages on pair 16—17 or pair 18—19 is reversed, the resultant will appear between conductors 20 and 21 with no voltage between 22 and 23. This is the characteristic typical of balanced biconjugate networks or hybrids. Thus, if energy is applied to branch *a* thereof, it will not appear in branch *c* thereof, but will be divided in equal inphase portions in branches *b* and *d*. Energy applied to branch *c* will not appear in branch *a*, but will be divided into equal out-of-phase portions in branches *b* and *d*. Thus, if equal components that are "in phase" according to the above characterization are applied to branches *a* and *c*, the components will combine in branch *d* with no energy appearing in branch *b*. However, if equal components having a relative phase 180 degrees different from the preceding inphase condition are applied by way of branches *a* and *c*, the components will combine in branch *b* of the network.

In order to facilitate connection of a single balanced transmission line or balanced wave energy device to any one of the pairs as it emerges from the hybrid, any of the pairs may be bent without disturbing operation of the system so long as at all points along the bend the conductors of the pair are equally spaced and remain perpendicular to the electric field vectors produced by the other pair. For example, conductors 22 and 23 of Fig. 1 may be bent in the plane of the pair as illustrated by bent portions 32 and 33. Also, conductors 20 and 21 may be bent if desired in planes parallel to the plane of pair 22—23 as shown by bent portions 34 and 35.

In all cases it is understood that the above-described arrangements are illustrative of a small number of the many specific embodiments which can represent applications of the principles of the invention. Numerous and varied other arrangements can readily be devised in accordance with these principles by those skilled in the art without departing from the spirit and scope of the invention.

What is claimed is:

1. A coupling network for interconnecting four high frequency electromagnetic wave transmission line branches, said network comprising four shorted two-conductor transmission line sections each having a short between the conductors at one end of said section substantially an odd multiple of one-quarter wavelengths of the mean wavelength of wave energy to be coupled electrically away from the open end thereof, the conductors at the open ends of said sections being connected in series as a bridge, two of said branches being connected respectively across the diagonals of said bridge, and the remaining two of said branches being connected respectively across the shorted ends of alternate sections.

2. A coupling network for interconnecting four high frequency electromagnetic wave transmission line branches each comprising two conductors, said network comprising four shorted two-conductor transmission line sections each having a short between the conductors at one end of said section substantially an odd multiple of one-quarter wavelength of the mean wavelength of wave energy to be coupled electrically away from the open end thereof, each section having one conductor at the open end thereof connected to one conductor of one of said branches and the other conductor at said open end connected to one conductor of a second of said branches, each section having the shorted end thereof connected respectively to one of the conductors of one of the remaining branches.

3. A coupling network for high frequency electromagnetic wave energy having four input conductors interconnected to four output conductors by a plurality of additional conductors, each input conductor joining at a first point with a first end of two of said additional conductors, the second end of each additional conductor joining at a second point with one of said output conductors and with the second end of another of said additional conductors, the electrical distance between said points being an odd multiple of one-quarter wavelengths of the mean wavelength of wave energy to be coupled.

4. A four-branch biconjugate network for electromagnetic wave energy having eight conductor terminals arranged in two groups of four with each group comprising two orthogonally related terminal pairs, said groups being separated from each other by an odd multiple of one-quarter wavelengths of said wave energy, eight elongated conductive elements connecting the terminals of one group to the terminals of the other group so that each terminal of one group is connected to a terminal of each pair of the other group, and means for coupling to and from a field of electromagnetic wave energy supported between each pair.

References Cited in the file of this patent

UNITED STATES PATENTS 2,769,146 Alford ---------------- Oct. 30, 1956